United States Patent
Lee et al.

(10) Patent No.: US 9,808,766 B2
(45) Date of Patent: Nov. 7, 2017

(54) PRESSURIZED-TYPE HOLLOW FIBER MEMBRANE MODULE AND FILTRATION SYSTEM COMPRISING THE SAME

(71) Applicant: KOLON INDUSTRIES, INC., Gwacheon-si, Gyeonggi-do (KR)

(72) Inventors: Ah Reum Lee, Yongin-si (KR); Yong-Cheol Shin, Seoul (KR); Heewan Moon, Seoul (KR)

(73) Assignee: KOLON INDUSTRIES, INC., Gwacheon-si, Gyeonggi-do (KR)

( * ) Notice: Subject to any disclaimer, the term of this patent is extended or adjusted under 35 U.S.C. 154(b) by 167 days.

(21) Appl. No.: 14/414,480

(22) PCT Filed: Jul. 24, 2013

(86) PCT No.: PCT/KR2013/006613
§ 371 (c)(1),
(2) Date: Jan. 13, 2015

(87) PCT Pub. No.: WO2014/017818
PCT Pub. Date: Jan. 30, 2014

(65) Prior Publication Data
US 2015/0165382 A1 Jun. 18, 2015

(30) Foreign Application Priority Data
Jul. 25, 2012 (KR) .......... 10-2012-0081002

(51) Int. Cl.
*B01D 63/02* (2006.01)
*B01D 61/08* (2006.01)

(52) U.S. Cl.
CPC .......... *B01D 63/02* (2013.01); *B01D 61/08* (2013.01); *B01D 2313/04* (2013.01); *B01D 2313/21* (2013.01)

(58) Field of Classification Search
CPC ........ B01D 61/08; B01D 61/18; B01D 61/28; B01D 63/02; B01D 63/022; B01D 65/003;
(Continued)

(56) References Cited

U.S. PATENT DOCUMENTS 3,526,275 A * 9/1970 Eirikis ................. F28F 9/0219
165/103
4,201,673 A * 5/1980 Kanno ................. B01D 63/02
210/321.81
(Continued)

FOREIGN PATENT DOCUMENTS

CN 100354032 C 12/2007
CN 102448589 A 5/2012
(Continued)

OTHER PUBLICATIONS

International Searching Authority, International Search Report of PCT/KR2013/006613 dated Jul. 24, 2013.

*Primary Examiner* — Pranav Patel
(74) *Attorney, Agent, or Firm* — Sughrue Mion, PLLC

(57) ABSTRACT

Disclosed are a pressurized-type hollow fiber membrane module having a pressure resistance higher than 3 kgf/cm$^2$ and a filtration system comprising the same. The pressurized-type hollow fiber membrane module comprises: a body case having an open end; a fixing member disposed in the body case at the open end; a hollow fiber membrane potted in the fixing member; and a cap on the open end of the body case, the cap and fixing member forming a filtrate-collecting space, wherein a lumen of the hollow fiber membrane is in fluid communication with the filtrate-collecting space, the fixing member has a step so that an upper side surface of the fixing member is not in contact with an inner surface of the body case, and a portion of the cap is inserted in a groove defined by the step of the fixing member and the inner surface of the body case.

15 Claims, 7 Drawing Sheets

(58) Field of Classification Search
CPC .............. B01D 69/08; B01D 2201/04; B01D 2201/0415; B01D 2201/043; B01D 2201/0438; B01D 2201/0446; B01D 2201/0453; B01D 2201/29; B01D 2201/291; B01D 2201/295; B01D 2201/30; B01D 2201/301; B01D 2201/302; B01D 2201/304; B01D 2201/305; B01D 2201/34; B01D 2201/342; B01D 2201/345; B01D 2201/347; B01D 2201/4061
See application file for complete search history.

(56) References Cited

U.S. PATENT DOCUMENTS

| | | | |
|---|---|---|---|
| 4,342,723 A * | 8/1982 | Sado | A61M 1/1698 210/321.75 |
| 7,491,329 B2 | 2/2009 | Takeda et al. | |
| 2004/0178136 A1 | 9/2004 | Taniguchi et al. | |
| 2005/0161389 A1 | 7/2005 | Takeda et al. | |
| 2005/0161394 A1 * | 7/2005 | Fritze | B01D 27/08 210/435 |
| 2006/0113235 A1 * | 6/2006 | Strohm | B01D 63/02 210/232 |
| 2007/0039868 A1 | 2/2007 | Ishibashi | |
| 2010/0155334 A1 | 6/2010 | Taniguchi et al. | |
| 2012/0097601 A1 | 4/2012 | Lee et al. | |

FOREIGN PATENT DOCUMENTS

| | | |
|---|---|---|
| JP | 61-802 U | 1/1986 |
| JP | 4-78929 U | 7/1992 |
| JP | 5-33831 U | 5/1993 |
| JP | 05-212252 A | 8/1993 |
| JP | 11-137972 A | 5/1999 |
| JP | 2011115796 A | 6/2011 |

* cited by examiner

PRESSURIZED-TYPE HOLLOW FIBER MEMBRANE MODULE AND FILTRATION SYSTEM COMPRISING THE SAME

TECHNICAL FIELD

The present invention relates to a pressurized-type hollow fiber membrane module and a filtration system comprising the same, and more particularly, to a pressurized-type hollow fiber membrane module having a pressure resistance higher than 3 kgf/cm$^2$ and a filtration system comprising the same.

BACKGROUND ART

Separation methods for water treatment include a method using a filtering membrane, a method using heat or phase-change, and so on. A separation method using a filtering membrane has a lot of advantages over the method using heat or phase-change. Among the advantages is the high reliability of water treatment since the water of desired purity can be easily and stably obtained by adjusting the size of the pores of the filtering membrane. Furthermore, since the separation method using a filtering membrane does not require a heating process, the membrane can be used with microorganisms which are useful for separation process but might be adversely affected by heat.

Among the separation methods using a filtering membrane is a method using a hollow fiber membrane module comprising a bundle of hollow fiber membranes. Typically, a hollow fiber membrane module has been widely used in the field of microfiltration and/or ultrafiltration for obtaining axenic water, drinking water, super pure water, and so on. Recently, the application of the hollow fiber membrane module is extended to wastewater treatment, solid-liquid separation in a septic tank, removal of suspended solid (SS) from industrial wastewater, filtration of river, filtration of industrial water, filtration of swimming pool water, and the like.

A hollow fiber membrane module may be classified into a submerged-type module and a pressurized-type module according to the operation manner thereof.

The submerged-type module performs the filtration process while immersed in fluid to be purified. Particularly, as negative pressure is applied inside the hollow fiber membrane, only pure fluid is allowed to penetrate the membrane and come into the lumen thereof while the contaminants such as impurities or sludge remains outside the membrane. The submerged-type module is advantageous in that it can decrease the costs for setting up the facilities and operating thereof since it does not require fluid circulation. It is disadvantageous, however, in that its permeation flux that can be obtained per unit time is relatively low.

On the other hand, during a filtration process by a pressurized-type module, a positive pressure is applied to the fluid outside the hollow fiber membrane so as to allow only pure fluid to penetrate the membrane and come into the lumen thereof. Although the pressurized-type module requires additional equipments for fluid circulation, it facilitates relatively high permeation flux per unit time, as compared to the submerged-type module.

Since the pressurized fluid is introduced into the body case of the pressurized-type module, the pressurized-type module is required to have some degree of pressure resistance. The conventional pressurized-type modules, however, exhibit the pressure resistance of at most 3 kgf/cm$^2$.

Thus, as shown in FIG. 1, if the conventional pressurized-type module is used for a filtration system which carries out the first filtration process by means of a pressurized-type hollow fiber membrane module 10 and the second filtration process by means of a reverse osmosis membrane module 30, the first filtrate produced by the pressurized-type hollow fiber membrane module 10 needs to be stored in a filtrate bath 20 first because the first filtrate cannot be a sufficiently pressurized one due to the relatively low pressure resistance of the pressurized-type hollow fiber membrane module 10. Further, it is required to provide a feeding pump P1 to supply the first filtrate stored in the filtrate bath 20 toward the reverse osmosis membrane module 30. The first filtrate supplied toward the reverse osmosis membrane module 30 by the feeding pump P1 is pressurized by a high-pressure pump P2 with a pressure high enough to operate the reverse osmosis membrane module 30.

Hereinafter, the structural reason why the conventional pressurized-type hollow fiber membrane module 10 cannot have the pressure resistance higher than 3 kgf/cm$^2$ will be described in detail with reference to the FIGS. 2 and 3. The FIG. 2 is a perspective view of the conventional pressurized-type hollow fiber membrane module, and the FIG. 3 is a cross-sectional view of the pressurized-type hollow fiber membrane module of FIG. 2 along the I-I' line.

As illustrated in FIG. 2 and FIG. 3, a conventional pressurized-type hollow fiber membrane module 10 comprises a body case 11 having an open end, a fixing member 12 disposed in and fixed to the body case 11 thereby closing the open end, hollow fiber membranes 13 with one ends potted in the fixing member 12, a cap 14 on the open end of the body case 11, the cap 14 and fixing member 12 forming a filtrate-collecting space S, and a fastening ring 15 which, when coupled to the body case 11 through a screw-type coupling manner, pushes the cap 14 toward the body case 11 thereby tightly connecting the body case 11 and the cap 14 together.

The lumens of the hollow fiber membranes 13 are in fluid communication with the filtrate-collecting space S. It is only pure water among the feed water introduced in the module 10 through the inlet IH of the body case 11 that penetrates the hollow fiber membranes 13. The filtrate flows along the lumens of the hollow fiber membranes 13, gets together in the filtrate-collecting space S, and then comes out of the module 10 through the outlet OH of the cap 14. Meanwhile, as the filtration is performed, the impurity concentration of the feed water in the body case 11 increases. The condensed water produced as such is discharged from the module 10 through the outlet OH of the body case 11.

As illustrated in FIG. 3, the whole side surface of the fixing member 12 is in contact with the inner surface of the body case 11, and the gap G between the body case 11 and cap 14 is exposed to the filtrate-collecting space S. To prevent the leakage of the filtrate in the filtrate-collecting space S through the gap G, there is provided a sealing member 16 between the top surface of the body case 11 and the bottom surface of cap 14.

However, as long as the gap G between the body case 11 and cap 14 is exposed to the filtrate-collecting space S, there cannot but exist a limitation in preventing the leakage of the filtrate by means of the sealing member 16. Particularly, when the conventional pressurized-type hollow fiber membrane module 10 is operated with a pressure higher than 3 kgf/cm$^2$, the pressure of the filtrates in the filtrate-collecting space S also increases and thus the leakage of the filtrate through the gap G between the body case 11 and cap 14 is inevitably caused.

DISCLOSURE

Technical Problem

Therefore, the present invention is directed to a pressurized-type hollow fiber membrane module capable of preventing these limitations and drawbacks of the related art and a filtration system comprising the same.

An aspect of the present invention is to provide a pressurized-type hollow fiber membrane module having a pressure resistance higher than 3 kgf/cm$^2$.

Another aspect of the present invention is to provide a filtration system which can perform the first filtration by means of a pressurized-type hollow fiber membrane module and the second filtration by means of a reverse osmosis membrane module without any intermediate processes between the first and second filtration for storing the first filtrate produced by the pressurized-type hollow fiber membrane module in a certain storage means and then feeding it into the osmosis membrane module.

Additional aspects and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims.

Technical Solution

In accordance with the one aspect of the present invention, there is provided a pressurized-type hollow fiber membrane module comprising: a body case having an open end; a fixing member disposed in the body case at the open end so that the open end is closed by the fixing member; a hollow fiber membrane potted in the fixing member; and a cap on the open end of the body case, the cap and fixing member forming a filtrate-collecting space, wherein a lumen of the hollow fiber membrane is in fluid communication with the filtrate-collecting space, the fixing member has a step so that an upper side surface of the fixing member is not in contact with an inner surface of the body case, and a portion of the cap is inserted in a groove defined by the step of the fixing member and the inner surface of the body case.

In accordance with another aspect of the present invention, there is provided a filtration system comprising: a pressurized-type hollow fiber membrane module for producing and discharging filtrate, the pressurized-type hollow fiber membrane module having a pressure resistance higher than 3 kgf/cm$^2$; a reverse osmosis membrane module; and a pump for directly receiving the filtrate from the pressurized-type hollow fiber membrane module, pressurizing the filtrate with a pressure high enough to operate the reverse osmosis membrane module, and providing the reverse osmosis membrane module with the pressurized filtrate.

It is to be understood that both the foregoing general description and the following detailed description of the present invention are exemplary and explanatory and are intended to provide further explanation of the invention as claimed.

Advantageous Effect

According to the present invention, there can be provided a pressurized-type hollow fiber membrane module of improved pressure resistance higher than 3 kgf/cm$^2$ which thus has high durability.

Further, by applying the pressurized-type hollow fiber membrane module of high pressure resistance to a filtration system, the first filtration by means of a pressurized-type hollow fiber membrane module and the second filtration by means of a reverse osmosis membrane module can be performed without any intermediate processes between the first and second filtration for storing the first filtrate produced by the pressurized-type hollow fiber membrane module in a certain storage means and then feeding it toward the osmosis membrane module. Consequently, a filtration system of relatively simple structure can be provided and operated at lower cost.

Other advantages of the present invention will be described below in detail together with the related technical features.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Hereinafter, the filtration system of the present invention will be described in detail with reference to the FIG. 4.

Figure 1:
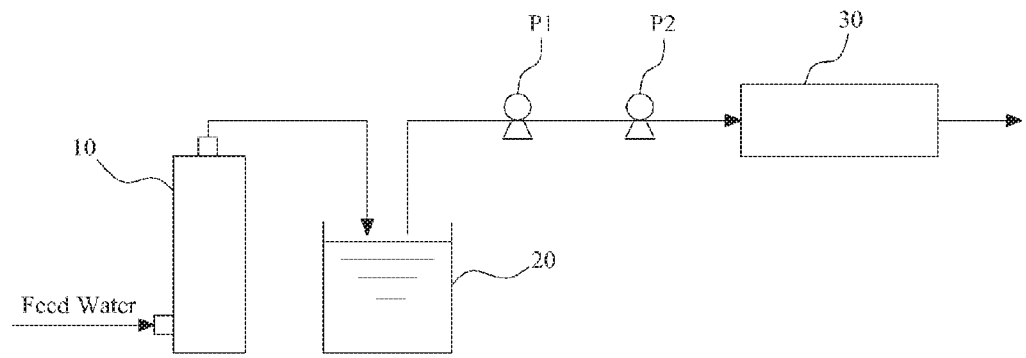
FIG. 1 is a block diagram illustrating a conventional filtration system.
Figure 2:
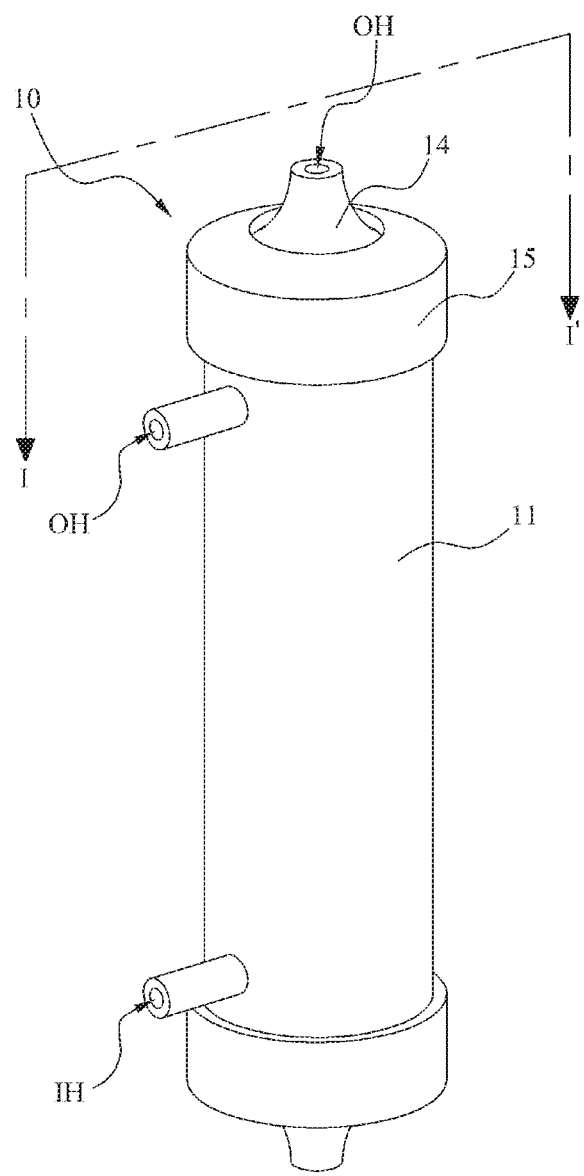
FIG. 2 is a perspective view of a conventional pressurized-type hollow fiber membrane module.
Figure 3:
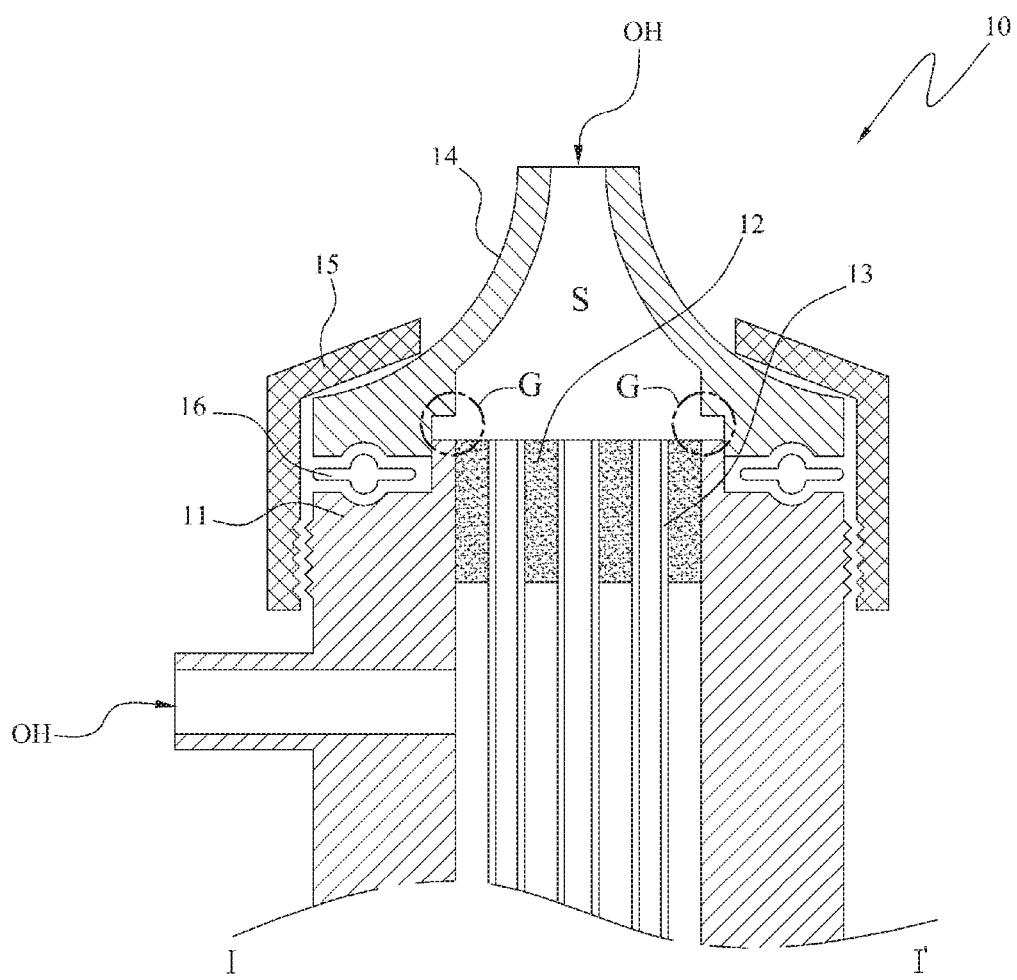
FIG. 3 is a cross-sectional view of the pressurized-type hollow fiber membrane module of FIG. 2 along the I-I' line.
Figure 4:
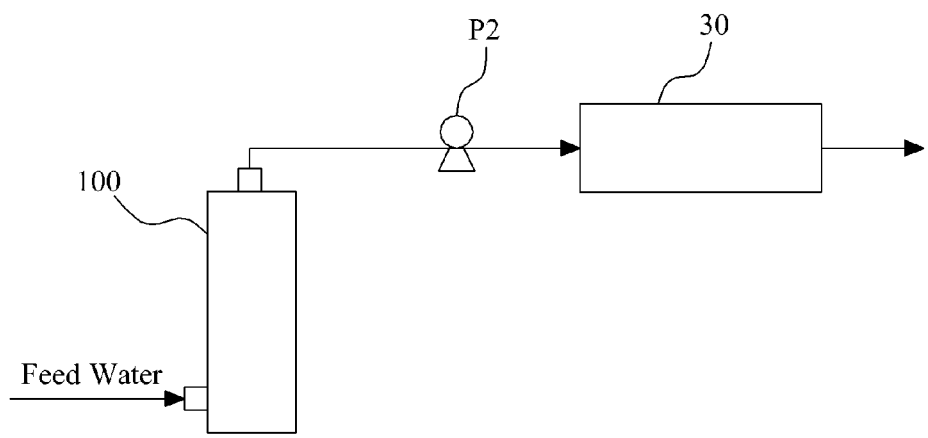
FIG. 4 is a block diagram illustrating a filtration system according to one embodiment of the present invention.

As illustrated in FIG. 4, the filtration system according to one embodiment of the present invention comprises a pressurized-type hollow fiber membrane module 100 for producing and discharging filtrate, the pressurized-type hollow fiber membrane module 100 having a pressure resistance higher than 3 kgf/cm$^2$, a reverse osmosis membrane module 30, and a pump P2 for directly receiving the filtrate from the pressurized-type hollow fiber membrane module 100, pressurizing the filtrate with a pressure high enough to operate the reverse osmosis membrane module 30, and providing the reverse osmosis membrane module 30 with the pressurized filtrate.

Since the pressurized-type hollow fiber membrane module 100 of the present invention has a pressure resistance higher than 3 kgf/cm$^2$, it can operate stably even under the operation pressure higher than 3 kgf/cm$^2$ without being damaged and without causing any leakage of the filtrate.

Further, since the filtrate produced by and discharged from the pressurized-type hollow fiber membrane module 100 operated with the pressure higher than 3 kgf/cm$^2$ is a sufficiently pressurized one, it can be directly supplied to the pump P2 without being temporarily stored in a filtrate bath and then further pressurized by an additional pump as required by the conventional filtration system.

The pump P2 receives the filtrate directly from the pressurized-type hollow fiber membrane module 100 and further pressurizes it with a pressure high enough to operate the reverse osmosis membrane module 30.

Consequently, according to the present invention, the first filtration by means of a pressurized-type hollow fiber membrane module 100 and the second filtration by means of a reverse osmosis membrane module 30 can be performed without any intermediate processes between the first and second filtration for storing the first filtrate produced by the pressurized-type hollow fiber membrane module 100 in a certain storage means and then feeding it toward the osmosis membrane module 30, and thus a filtration system of relatively simple structure can be provided and operated at lower cost.

Hereinafter, the embodiments of the pressurized-type hollow fiber membrane module 100 of the present invention having a pressure resistance higher than 3 $kgf/cm^2$ will be described in detail with reference to the FIGS. 5 to 7.

Figure 5:
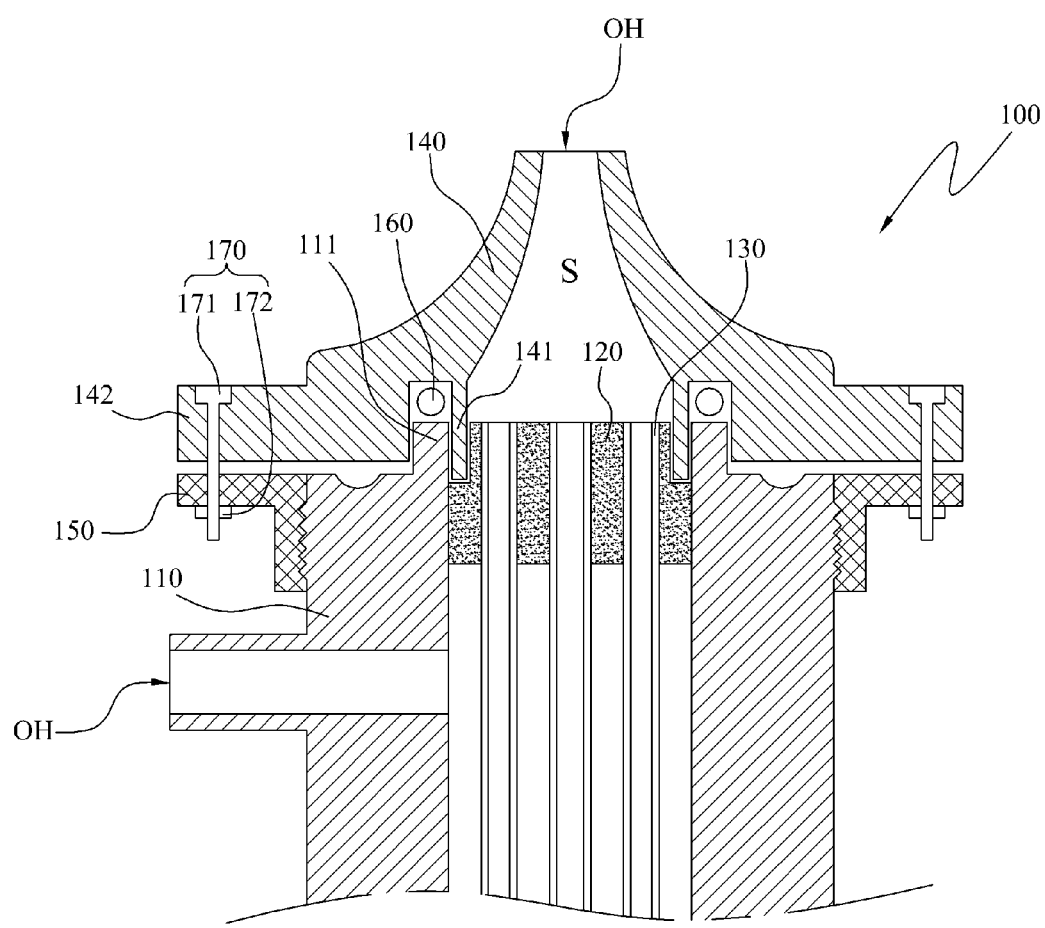
FIG. 5 illustrates an upper cross section of the pressurized-type hollow fiber membrane module according to the first embodiment of the present invention.

FIG. 5 illustrates an upper cross section of the pressurized-type hollow fiber membrane module according to the first embodiment of the present invention.

As shown in FIG. 5, the pressurized-type hollow fiber membrane module 100 according to the first embodiment of the present invention comprises a body case 110 having an open end, a fixing member 120 disposed in the body case 110 at the open end so that the open end is closed by the fixing member 120, a hollow fiber membrane 130 potted in the fixing member 120, and a cap 140 on the open end of the body case 110, the cap 140 and fixing member 120 forming a filtrate-collecting space S.

One end of the hollow fiber membrane 130 potted in the fixing member 120 is open so that the lumen of the hollow fiber membrane 130 is in fluid communication with the filtrate-collecting space S.

Although now shown, the lower portion of the pressurized-type hollow fiber membrane module 100 has same structure as that of the upper portion described above except that a plurality of holes are formed in the lower fixing member for the passage of the fluid to be treated and the other end of the hollow fiber membrane 130 potted in the lower fixing member is closed.

It is only pure water among the feed water introduced in the pressurized-type hollow fiber membrane module 100 through the inlet at the lower portion of the body case 110 that penetrates the hollow fiber membrane 130. The filtrate flows along the lumen of the hollow fiber membrane 130, gets together in the filtrate-collecting space S, and then comes out of the pressurized-type hollow fiber membrane module 100 through the outlet OH of the cap 140.

Meanwhile, as the filtration is performed, the impurity concentration of the feed water in the body case 110 increases. The condensed water produced as such is discharged from the pressurized-type hollow fiber membrane module 100 through the outlet OH of the body case 110.

Once the filtration is completed, the feed water in the body case 110 passes through the holes of the lower fixing member and then comes out of the pressurized-type hollow fiber membrane module 100 through the outlet of a lower cap (not shown) coupled to the other open end of the body case 110.

As illustrated in FIG. 5, although the fixing member 120 of the present invention is disposed in the body case 110 at the open end and fixed thereto, it is not the whole side surface of the fixing member 120 that is in contact with the inner surface of the body case 110. In detail, the fixing member 120 of the present invention has a step so that only the side surface other than the upper side surface of the fixing member 120 is in contact with the inner surface of the body case 110, i.e., the upper side surface of the fixing member 120 is not in contact with the inner surface of the body case 110. Thus, when the fixing member 120 of the present invention is formed in and fixed to the body case 110 at the open end, a groove defined by the step of the fixing member and the inner surface of the body case is formed.

When the cap 140 is coupled to the open end of the body case 110 thereby forming the filtrate-collecting space S surrounded by the cap 140 and fixing member 120, a portion 141 of the cap 140 is inserted in the groove defined by the step of the fixing member 120 and the inner surface of the body case 110. The fixing member may be formed of an elastic material such as polyurethane, and it is desirable in terms of leakage protection to make the groove a little bit smaller than the portion 141 of the cap 140 so that the portion 141 of the cap 140 can be tightly inserted into the groove.

According to the present invention as described above, only the gap between the portion 141 of the cap 140 and the fixing member 120 which are in tight contact with each other is exposed to the filtrate-collecting space S, and the gap between the body case 110 and cap 140 is not exposed directly to the filtrate-collecting space S. Accordingly, even when the pressurized-type hollow fiber membrane module 100 is operated with a pressure higher than 3 $kgf/cm^2$ and thus the pressure of the filtrate in the filtrate-collecting space S increases, it can perform the filtration process with high permeation flux without being damaged and without causing any leakage of the filtrate as well.

Optionally, the pressurized-type hollow fiber membrane module 100 may further comprise a sealing member 160, e.g., O-ring, interposed between the open end of the body case 110 and the cap 140 so that the filtrate leakage, if any, through the gap between the portion 141 of the cap 140 and the fixing member 120 which are in tight contact with each other and the gap between the body case 110 and cap 140 can be completely prevented.

A groove may be formed on the bottom surface of the cap 140 which is in contact with the open end of the body case 110, and the body case 110 may comprise a protrusion 111 at the open end. When the body case 110 and the cap 140 are coupled to each other, the protrusion 111 of the body case 110 is inserted in the groove of the cap 140. The sealing member 160 is within the groove of the cap 140 and between the cap 140 and the protrusion 111.

To couple the body case 110 and cap 140 together tightly, the pressurized-type hollow fiber membrane module 100 of the present invention may further comprise a supporting member 150 on the outer surface of the open end of the body case 110, the supporting member 150 being combined with the body case 110, and a fastener 170 penetrating both the supporting member 150 and the portion 142 of the cap 140 to maintain the cap 140 and body case 110 in a close relationship with each other.

The fastener 170 may comprise a bolt 171 and a nut 172.

Hereinafter, the pressurized-type hollow fiber membrane module according to the second embodiment of the present invention will be described in detail with reference to the FIG. 6. FIG. 6 illustrates an upper cross section of the pressurized-type hollow fiber membrane module according to the second embodiment of the present invention.

Since the pressurized-type hollow fiber membrane module according to the second embodiment of the present invention is almost same as the aforementioned pressurized-type hollow fiber membrane module according to the first embodiment, the features of the second embodiment different from those of the first embodiment will be mainly described.

Figure 6:
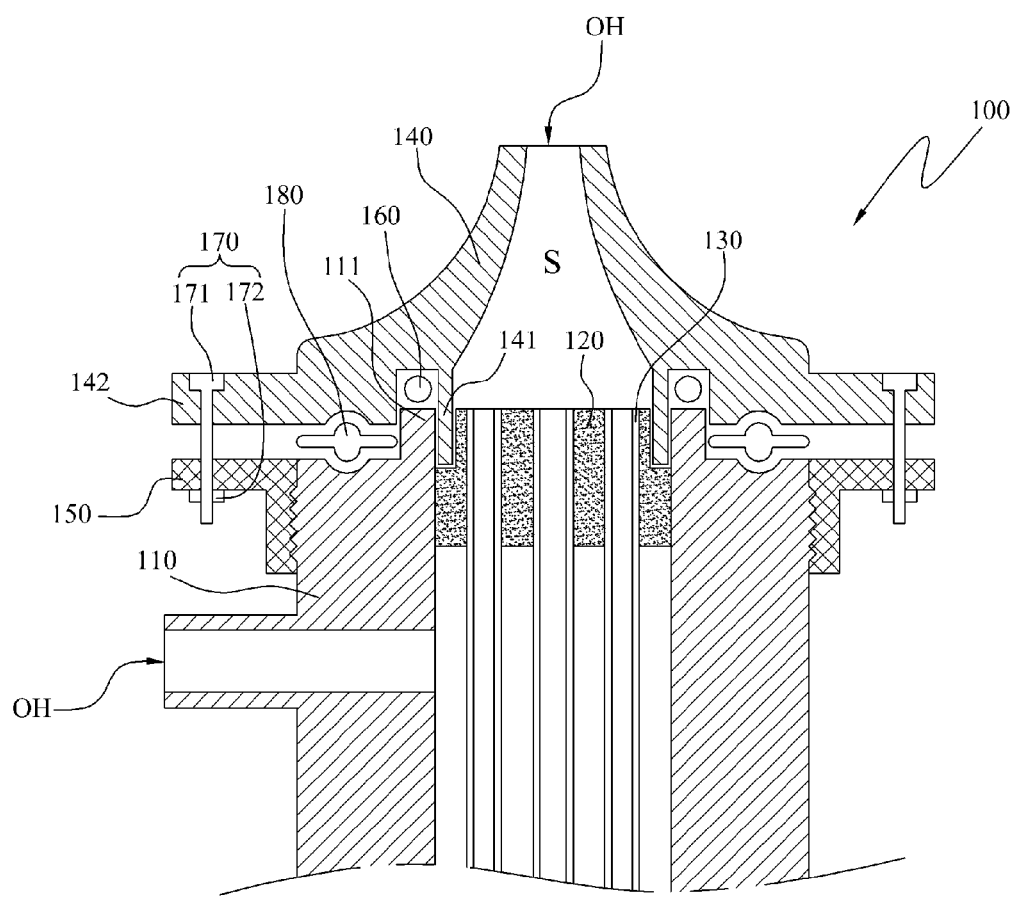
FIG. 6 illustrates an upper cross section of the pressurized-type hollow fiber membrane module according to the second embodiment of the present invention.

As illustrated in FIG. 6, the pressurized-type hollow fiber membrane module 100 according to the second embodiment of the present invention comprises the first and second sealing members 160 and 180 interposed between the open end of the body case 110 and the cap 140 so that the filtrate leakage, if any, through the gap between the portion 141 of the cap 140 and the fixing member 120 which are in tight contact with each other and the gap between the body case 110 and cap 140 can be completely prevented.

A groove is formed on the bottom surface of the cap 140 which is in contact with the open end of the body case 110, and the body case 110 comprises a protrusion 111 at the open end. When the body case 110 and the cap 140 are coupled to each other, the protrusion 111 of the body case 110 is inserted in the groove of the cap 140. The first sealing member 160 is disposed within the groove of the cap 140 and between the cap 140 and the protrusion 111. The first sealing member 160 may have a shape of a looped curve.

The second sealing member 180 is disposed radially outside the first sealing member 160 and between the open end of the body case 110 and cap 140. The second sealing member 160 can guarantee the filtrate leakage protection fore more sure.

Hereinafter, the pressurized-type hollow fiber membrane module according to the third embodiment of the present invention will be described in detail with reference to the FIG. 7. FIG. 7 illustrates an upper cross section of the pressurized-type hollow fiber membrane module according to the third embodiment of the present invention.

Since the pressurized-type hollow fiber membrane module according to the third embodiment of the present invention is also almost same as the aforementioned pressurized-type hollow fiber membrane module according to the first embodiment, the features of the third embodiment different from those of the first embodiment will be mainly described.

Figure 7:
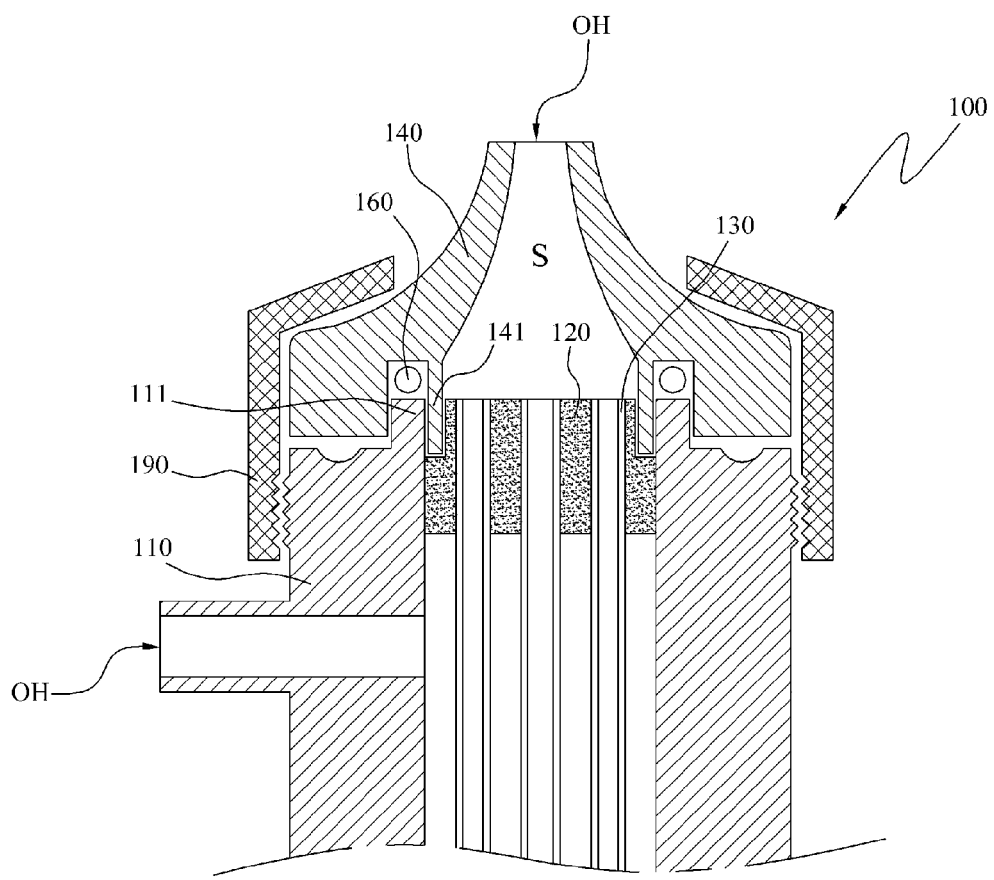
FIG. 7 illustrates an upper cross section of the pressurized-type hollow fiber membrane module according to the third embodiment of the present invention.

As illustrated in FIG. 7, the pressurized-type hollow fiber membrane module 100 according to the third embodiment of the present invention comprises a fastening ring 190 as an element for tightly connecting the body case 110 and cap 140 together, instead of the supporting member 150 of the first embodiment. When coupled to the body case 110 through a screw-type coupling manner, the fastening ring 190 pushes the cap 140 toward the body case 110 thereby tightly connecting the body case 110 and cap 140 together.

Those skilled in the art will appreciate that various modifications, additions and substitutions are possible, without departing from the scope and spirit of the invention. Accordingly, the present invention includes all alternations and modifications that fall within the scope of inventions described in claims and equivalents thereto.

The invention claimed is:

1. A pressurized-type hollow fiber membrane module comprising:
   a body case having an open end;
   a fixing member disposed in the body case at the open end so that the open end is closed by the fixing member, the fixing member being formed of an elastic material;
   a hollow fiber membrane potted in the fixing member; and
   a cap on the open end of the body case, the cap and the fixing member forming a filtrate-collecting space,
   wherein a lumen of the hollow fiber membrane is in fluid communication with the filtrate-collecting space,
   the fixing member has a step so that an upper side surface of the fixing member is not in contact with an inner surface of the body case, thereby forming a first groove defined by the step of the fixing member and the inner suface of the body case, and
   a portion of the cap is inserted in the first groove, wherein an inner dimension of the first groove is smaller than the portion of the cap so that the portion of the cap can be tightly inserted into the first groove.

2. The pressurized-type hollow fiber membrane module of claim 1, further comprising a sealing member interposed between the open end of the body case and the cap.

3. The pressurized-type hollow fiber membrane module of claim 2, wherein a second groove is formed on a bottom surface of the cap, the bottom surface being in contact with the open end of the body case,
   the body case comprises a protrusion at the open end, the protrusion being inserted in the second groove of the cap, and
   the sealing member is within the second groove of the cap and between the cap and the protrusion.

4. The pressurized-type hollow fiber membrane module of claim 1, further comprising:
   a supporting member on an outer surface of the open end of the body case, the supporting member being combined with the body case; and
   a fastener penetrating both the supporting member and the cap to maintain the cap and the body case in a close relationship with each other.

5. The pressurized-type hollow fiber membrane module of claim 4, wherein the fastener comprises a bolt and a nut.

6. The pressurized-type hollow fiber membrane module of claim 1, further comprising a first and second sealing members interposed between the open end of the body case and the cap,
   wherein a second groove is formed on a bottom surface of the cap, the bottom surface being in contact with the open end of the body case,
   the body case comprises a protrusion at the open end, the protrusion being inserted in the second groove of the cap,
   the first sealing member is within the second groove of the cap and between the cap and the protrusion,
   the first sealing member has a shape of a looped curve, and
   the second sealing member is disposed radially outside the first sealing member.

7. The pressurized-type hollow fiber membrane module of claim 1, further comprising a fastening ring for tightly connecting the body case and cap together, the fastening ring pushing the cap toward the body case when coupled to the body case through a screw-type coupling manner.

8. A filtration system comprising:
   a pressurized-type the pressurized-type hollow fiber membrane module of claim 1 for producing and discharging filtrate, the pressurized-type hollow fiber membrane module having a pressure resistance higher than 3 kgf/cm$^2$;
   a reverse osmosis membrane module; and
   a pump for directly receiving the filtrate from the pressurized-type hollow fiber membrane module, pressurizing the filtrate with a pressure high enough to operate the reverse osmosis membrane module, and providing the reverse osmosis membrane module with the pressurized filtrate.

9. The filtration system of claim 8, wherein the filtrate is discharged from an outlet of the cap via the filtrate-collecting space.

10. The filtration system of claim 8, wherein the pressurized-type hollow fiber membrane module further comprises a sealing member interposed between the open end of the body case and the cap.

11. The filtration system of claim 10, wherein a second groove is formed on a bottom surface of the cap, the bottom surface being in contact with the open end of the body case,
the body case comprises a protrusion at the open end, the protrusion being inserted in the second groove of the cap, and
the sealing member is within the second groove of the cap and between the cap and the protrusion.

12. The filtration system of claim 8, wherein the pressurized-type hollow fiber membrane module further comprises:
a supporting member on an outer surface of the open end of the body case, the supporting member being combined with the body case; and
a fastener penetrating both the supporting member and the cap to maintain the cap and the body case in a close relationship with each other.

13. The filtration system of claim 12, wherein the fastener comprises a bolt and a nut.

14. The filtration system of claim 8, wherein the pressurized-type hollow fiber membrane module further comprises a first and second sealing members interposed between the open end of the body case and the cap,
a second groove is formed on a bottom surface of the cap, the bottom surface being in contact with the open end of the body case,
the body case comprises a protrusion at the open end, the protrusion being inserted in the second groove of the cap,
the first sealing member is within the second groove of the cap and between the cap and the protrusion,
the first sealing member has a shape of a looped curve, and
the second sealing member is disposed radially outside the first sealing member.

15. The filtration system of claim 8, wherein the pressurized-type hollow fiber membrane module further comprises a fastening ring for tightly connecting the body case and the cap together, the fastening ring pushing the cap toward the body case when coupled to the body case through a screw-type coupling manner.

* * * * *